United States Patent Office 3,072,595
Patented Jan. 8, 1963

3,072,595
PUNK RESISTANT, WATER-DILUTABLE BINDER COMPOSITIONS COMPRISING A PHENOLIC RESOLE AND A POLYMERIC CONDENSATION PRODUCT OF AN ALKYL ETHER OF DIMETHYLOL UREA, AND MINERAL FIBERS BONDED THEREWITH
Bruce P. Barth, Bound Brook, and Arthur K. Ingberman, Somerville, N.J., assignors to Union Carbide Corporation, a corporation of New York
No Drawing. Filed Dec. 24, 1959, Ser. No. 861,737
17 Claims. (Cl. 260—45.1)

This invention relates to punk resistant, water-dilutable, liquid binder compositions. More particularly, the invention relates to water soluble phenolic resole resin-containing liquid binder compositions which are water-dilutable and useful and advantageous as nonpunking binders in mineral fiber insulation batts and the like.

Thermal insulation batts, acoustical tiles and similar structures generally comprise glass wool, rock wool, or other mineral fibers held together by a resinous binder present in amounts of about 5–20% by weight to impart strength and resiliency to the structure and preserve original insulating, acoustical, dimensional and other properties.

The resinous binders used in the formation of these structures must primarily be water-dilutable and non-punking. The property of high water dilutability is essential in the manufacture of the batts, as hereinbelow explained. The property of punking resistance is a highly desirable feature in the final product and has long been sought by the art.

Water dilutability for insulation binders refers to stability of the binder upon water dilution and is a requisite property of binders used in methods by which insulation batts are presently produced. In the generally used procedure, molten glass, slag or other molten, fiber-forming material entering the top of a forming hood or blowing chamber is drawn into fiber-like elongated shapes or strands by a blast of high pressure steam. Immediately thereafter the strands are sprayed with a convenient viscosity solution, suspension or emulsion of thermosetting resin in water and then allowed to settle onto a conveyer belt in the form of a continuous mat. The water thus introduced into the blowing chamber, by absorbing its heat of vaporization, cools the chamber and the strands harden into fibers. The fibers being formed are simultaneously coated with liquid, virtually anhydrous, resin binder and after collection at the bottom of the chamber in a matted arrangement, are passed through a curing oven where the resinous binder sets to form a mat which can thereafter be cut into the desired size pieces.

It is clear that batt binding resins useful in this typical method must be both liquid and water-dilutable. Not all resins meeting these primary requirements, however, are useful for bonding batts. Many phenolic resins both liquid and water-dilutable which are currently known and used in the art for bonding fiber batts are not sufficiently combustion resistant. The introduction of a hot rivet or slug of hot glass or similar heated object into the batt, or conduction of heat from an adjacent object, such as a high pressure steam pipe, can initiate in some binder compositions a highly exothermic combustion which propagates itself through the batt or like structure, gradually consuming the resinous binder, leaving a fine, white, powdery ash. The smoldering or slow, flameless burning is termed "punking."

The temperatures caused by a punking reaction are ordinarily not sufficient to ignite the fibers forming the batt, but readily combustible material found almost invariably in the vicinity of the punking reaction will likely become ignited. For example, wooden walls and paint on various surfaces, including metal surfaces, have been ignited by punking occurring proximate thereto and disastrous fires have resulted. Punking-type combustion is especially pernicious since it can continue unnoticed and is so easily initiated, e.g. in ships by the use of hot rivets or welding apparatus during repair, in buildings by a break in electrical wiring passing through an insulating batt or in batts stored in boxcars and warehouses from a latent hot slug of glass in the finished batt itself.

Nonpunking resins are known, but are unsuited for insulation batts and like structures, either because of prohibitive cost, as in the case of melamine resins, or processing difficulties and poor final properties. A resin having good nonpunking properties is a dicyandiamide-formaldehyde resin, but this advantage does not outweigh undesirable factors such as high cost, instability upon water dilution, and poor water resistance when cured.

Nonpunking binder compositions have heretofore been obtained chiefly by the use, in conjunction with a water soluble phenolic resin, of a urea or a urea-formaldehyde resin in sufficient quantity to provide about 15% by weight nitrogen based on total resin solids in the binder composition. These nonpunking compositions have been produced in various ways, namely simultaneous reaction of phenol, urea, and formaldehyde; reaction of phenol alcohols and urea; reaction of phenols and methylol ureas; and combinations of the foregoing. The cost of these nonpunking resins, however, in terms of processing difficulties, erratic storage behavior, and precuring tendencies no matter by what reaction sequence or with what reactant proportions prepared, has made these urea containing resins commercially unacceptable. The difficulties associated with these resins are, in general, attributable to the relatively great reactivity of urea.

The result of the presence of urea resins in heretofore known nonpunking insulation batt binders has been a marked lack of stability upon water dilution and a tendency to precure during batt manufacture.

In order for a resin to be commercially acceptable as a binder in insulation, the resin must have stability, i.e., show no signs of phase separation or formation of hard, pastelike insoluble phases. Binders containing urea resin are normally prone to irreversibly undergo phase separation and this tendency is increased when the resin is diluted with water. Frequently this separation occurs in as few as five or six hours, and, hence, binders containing urea resins are extremely disadvantageous from a processing standpoint and undesirable despite their nonpunking character.

As outlined above, the binder is sprayed onto the molten material, cooling and coating the material to form coated fibers which form a mat. It has been found that binders containing urea resins are either deficient in degree of bond strength imparted, or have a tendency to punk. This is because during the water/liquid binder spraying step of the above-described method, the urea resins present "precure" i.e. form hard, nonflowing and hence nonbonding specks. As a result, the proportion of binder which actually is available for bonding is reduced. Unless the amount of binder is increased, the quality of the bond obtained is inferior. But increasing the binder content in the batt to ensure adequate bonding increases the tendency to punk since punking is roughly proportionate to binder content.

Additionally, the presence of urea resins in the batt bond adversely affects water resistance. It is well known that cured urea-formaldehyde resins have poor water resistance. Cured binder systems having a urea-formaldehyde resin content are, to the extent of that content, more vulnerable to attack by water. When a binder mixture comprising a urea-formaldehyde resin and either a phenol or a phenolic resin is cured, little of no inter-reaction occurs between the urea resin and the phenol or the phenolic resin. This is because the reactivity of a urea resin molecule towards any other urea or urea resin molecules present is much greater than its reactivity towards a phenol or a phenolic resin. As a result urea self-reaction or "homopolymerization" proceeds so quickly as to virtually exclude urea resin-phenol or urea resin-phenolic resin inter-reaction or "copolymerization." The cured product, therefore, is a mixture predominantly containing cured urea resin (homopolymer) and phenol, or cured phenolic resin (homopolymer) and very little, quite possibly no, urea-phenolic resin inter-reaction product (copolymer). The presence of urea resin (homopolymer) is believed responsible in large measure for the poor water resistance properties characteristic of heretofore known non-punking binder compositions.

It is clear from the foregoing that the art has not been able to obtain in insulation batts, acoustical tile and the like the advantages of nonpunking, good bonding behavior and a fair degree of water resistance simultaneously, but has had, heretofore, to compromise one or more of these desirable properties. And binders offering some of these properties have been difficult to process because of instability.

It is an object, therefore, of the present invention to provide a liquid binder composition for mineral fibers which is water-dilutable before cure and is nonpunking after cure.

It is another object to provide a binder for mineral fibers which is simultaneously nonpunking, water resistant and strong.

It is another object to provide a binder for mineral fibers which is stable during use and water-dilutable.

It is still another object to provide heat curable compositions containing urea resin which are water resistant when cured.

In general, these and other objects of the invention are achieved with a heat-curable composition comprising a blend of a liquid, water soluble phenolic resole and a liquid, water-dilutable reaction product of a lower alkyl ether of dimethylol urea with itself or with mononuclear phenols. These compositions are heat curable, that is, heating the compositions to an elevated temperature causes cross-linking between constitutent molecules to form a three-dimensional network of molecules and provides an infusible, thermoset resin which is nonpunking and water resistant.

The advantages of the heat-curable blend include good aging characteristics, dependable bonding performance, no tendency to spray dry, excellent resistance to punking and good water resistance. Further, the blends are lighter in color than unmodified phenolics.

As used herein the terms "water dilutability" and "water solubility" are synonomous both referring to a characteristic ability of the blends of this invention, and of each of its components to be mixed with water in significant but not necessarily infinite amounts without separating into a discernible phase. As applied to the blends of this composition these terms, water dilutability and water solubility, indicate that water can be added to the blends without clouding or precipitation occurring. The amounts of water added to the blend in practice is critical since addition of too much will cause precipitation. The need for water dilutability varies from application to application, but generally a range of 1:1 to about 20:1 of parts water to parts blend is completely adequate with a less broad range usually sufficient. To be useful for batts and the like, a resin must be dilutable with at least four parts of water per part of resin and preferably is dilutable with above 9 parts of water per parts of resin when made, to allow for a probable decrease in this property upon aging in storage.

Water-dilutable, liquid phenolic resins useful in the present invention are the water soluble resoles well known to the art, such as those disclosed in U.S. 2,034,457 to Bender, U.S. 2,190,672 to Meharg and U.S. 2,748,101 and 2,758,101, both to Shappell. In general, these water-dilutable, liquid phenolic resins are prepared by reaction, up to a point before formation of water insoluble reaction products, of from one to three moles of formaldehyde, in any of its commercial forms such as paraform or formalin, with one mole of a phenol in the presence of catalyst such as alkali and alkaline earth metal hydroxides, e.g., sodium hydroxide and barium hydroxide, alkali and alkaline earth metal salts, e.g., sodium carbonate, alkali and alkaline earth metal oxides, e.g., barium oxide, and quarternary substituted ammonium hydroxides having as substituents alkyl, aryl or hydroxyalkyl groups. If desired, the catalyst can be partially or wholly neutralized with mineral or organic acids upon completion of the reaction.

The liquid heat reaction products made using lower alkyl ethers of dimethylol urea which are useful in the blends of this invention are:

(A) the homopolymeric self-condensation reaction products of monomethyl, monethyl, dimethyl or diethyl ethers of dimethylol urea with themselves or with one another and, (B) the copolymeric condensation reaction products of dimethyl or diethyl ethers of dimethylol urea with mononuclear phenols having three replaceable hydrogen atoms. The term "an alkyl ether of dimethylol urea" as used herein is intended to include both the monoalkyl ethers of dimethylol urea and the dialkyl ethers of dimethylol urea wherein the alkyl group or groups contain from 1 to 2 carbon atoms, inclusive.

The homopolymeric self-condensation reaction products of the lower alkyl ethers of dimethylol urea can be prepared by heating the ether in the presence of, or preferably in the absence of water until a resin of the desired viscosity is reached. For blends with water-dilutable liquid phenolic resins useful for batt bonding, these homopolymers should have a Gardner Tube viscosity of 50 to 10,000 centistokes and preferably from 100 to 1,000 centistokes when containing from 14–16% water indicated by a Karl Fischer test. The presence of water in amounts of 10 to 20% by weight in the reaction mixture, although not required, is generally desirable to keep the product at a convenient viscosity, i.e., liquid to semi-liquid. This amount of water can be varied with higher amounts lengthening the time of reaction and lower amounts shortening it without any variation in the ultimate product.

The copolymeric reaction products of lower alkyl ethers of dimethylol urea with phenol are low viscosity liquids produced as described in the copending application of B. P. Barth and A. K. Ingberman, Serial No. 861,738, filed December 24, 1959. In general, the copolymers are prepared by heating a reaction mixture comprising one to three moles of the dialkyl ether of dimethylol urea per mole of phenol. Preferably, all the phenol employed in the reaction is trifunctional phenol having three replaceable hydrogens on the ring. Use of a mixture of phenols comprising in largest proportion trifunctional phenol and some mono- or difunctional phenols such as cresols and xylenols also forms copolymers useful in the present invention. Heating above room temperature is preferably used to carry out the reaction. Reflux temperatures at atmospheric pressure are preferred. Copolymers prepared from phenol per se and lower dialkyl ethers of dimethylol urea reflux under atmospheric pressure at about 90–95° C. Use of lower temperatures lengthens time of reaction. The pH of the reaction mass is not narrowly critical. A pH below 7 provides generally faster reaction and is preferred. A pH between 4 and 6 provides an easily controlled reaction lasting from ½ to 6 hours and is hence particularly preferred. Observing the above-given reaction conditions, a reaction time of ½ to 6 hours yields a preferred copolymeric heat reaction product having a viscosity of from 50 to 10,000 centistokes at 56–64% non-volatile matter (N.V.M.) content and is preferably within the range of 100 to 1000 centistokes.

For purposes of this specification, non-volatile matter (N.V.M.) content of a material is the percentage by weight of the material which remains as residue when a sample of the material, weighing approximately 1.5 grams, is heated in a two-inch diameter, shallow, open ointment tin for three hours at 135° C.

The blends of this invention are prepared by intermixing a phenolic resole with a heat reaction product made from the ether of dimethylol urea with enough agitation to secure preferably highly homogeneous liquid mixture.

The amount of homopolymeric and/or copolymeric heat reaction products of ethers of dimethylol urea present in the blends of this invention with respect to the resole present is not narrowly critical with virtually any ratio providing a corresponding modified balance of properties. Improvement in punking resistance is noticeable in blends containing above about 25 parts by weight (N.V.M.) of the above ether of dimethylol urea reaction products per 100 parts by weight (N.V.M.) of the blend. Water resistance of bonds obtained with the blends is entirely adequate up to an ether of dimethylol urea reaction product content of up to 75 parts by weight (N.V.M.) per 100 parts by weight (N.V.M.) of the blend. Therefore, from 25 to 75 parts by weight (N.V.M.) of the ether of dimethylol urea reaction products per 100 parts by weight (N.V.M.) of the blend is preferred where both punking resistance and water resistance are of substantial importance. Where one or both of these properties is either more important or not critical these preferred limits can be varied accordingly.

Preparations of the components of the blends of this invention are illustrated hereafter. All parts and percentages are by weight.

I. PREPARATION OF WATER-DILUTABLE LIQUID PHENOLIC RESIN

Three phenolic resoles were prepared:

Resole A (viscosity 497 cst. @ 25° C.; 67.8% N.V.M.) was prepared from phenol and 2.3 moles of formaldehyde, charged as 37% formalin, per mole of phenol, employing 13.8 parts of 25% NaOH per 100 parts of phenol as a catalyst.

Resole B (viscosity 225 cst. @ 25° C.; 68.3% N.V.M.) was prepared from phenol and 2.7 moles of formaldehyde, charged as 37% formalin, per mole of phenol, employing 25 parts of 25% NaOH per 100 parts of phenol as a catalyst.

Resole C (viscosity 61 cst. @ 25° C.; 59.9% N.V.M.) was prepared from phenol and 3.0 moles of formaldehyde, charged as 37% formalin, per mole of phenol, employing a molar equivalent of NaOH.

Resole C had a 60% higher trimethylolphenol content than Resole B, 42% trimethylol phenol content vs.

25% for Resole B. Resole C was found to have (1) better compatibility with the reaction products of mono- and dialkyl ethers of dimethylol urea having a relatively greater molecular weight (viscosity) as well as (2) superior stability upon dilution after aging.

II. PREPARATION OF POLYMERS OF ALKYL ETHERS OF DIMETHYLOL UREA

A. *Homopolymers—Dimethyl Ether of Dimethylol Urea*

To 150 pounds of 37% formalin in a jacketed still was added 50 pounds of urea. The pH was adjusted to 9.7 by addition of 113 grams of 25% NaOH. The mixture was continuously agitated for 22 hours during which the reaction mixture was maintained at a temperature of 20–25° C. by external cooling. A white precipitate of dimethylol urea having a free formaldehyde content of 2.2% formed.

To this product was added 200 pounds of methanol. The pH was lowered to 2.8 by the addition of 109 grams of concentrated sulfuric acid. After agitation for one and one-half hours, during which time the solution cleared, 275 grams of 25% NaOH was added, changing the pH to 7.8. A portion of the resulting solution comprising dimethyl ether of dimethylol urea dissolved in methanol and water, in admixture with minor amounts of monomethyl ether of dimethylol urea was then concentrated by heating at 38–47° C. and under 24–28.5 mm. Hg vacuum for 56 minutes. Water content in the solution which had been reduced by this evaporation to 11.3% was brought up to 15% by addition of water and the pH was adjusted to 5.1 with 20% sulfuric acid. The solution was reacted by heating to reflux for two hours and thirty-five minutes. After cooling, the pH was adjusted to 6.8 with 25% NaOH. The resulting homopolymer of dimethyl ether of dimethylol urea, herein designated "Resin #1," had an N.V.M. content of 64.7% and a viscosity of 300 cst. at 25° C.

The above procedure was repeated with variations in water content and/or pH and/or reflux time to obtain homopolymers varying in N.V.M. content and viscosity. These preparations are summarized in Table I below.

TABLE I

| Resin No. | Starting Material | Reaction | | | | Product | |
|---|---|---|---|---|---|---|---|
| | | Percent H₂O | pH | Time (min.) | Temp. (92–95° C.) | N.V.M. (percent) | Viscosity (cst.) |
| 1 | dimethyl ether of dimethylol urea. | 15 | 5.1 | 155 | reflux | 64.7 | 300 |
| 2 | ---- do ------------- | 15 | 4.6 | 33 | ---- do ---- | 58.3 | 160 |
| 3 | ---- do ------------- | 14.2 | 5.6 | 97 | ---- do ---- | 63.2 | 220 |
| 4 | ---- do ------------- | 19 | 4.8 | 110 | ---- do ---- | 55.7 | 180 |
| 5 | ---- do ------------- | 15 | ¹ 5.2 / 5.0 | 90 / 40 | ---- do ---- | 61.2 | 360 |
| 6 | Resin 5 | -------- | -------- | 20 | ---- do ---- | 63.6 | 580 |

¹ pH adjusted to 5.0 after 90 min. and reaction continued for an additional 40 min.

B. *Homopolymers—Diethyl Ether of Dimethylol Urea*

To 1500 grams of 37% formalin was added 500 grams of urea. The pH was adjusted to 9.5 with 25% sodium hydroxide. The reaction was run with agitation and external cooling to 20–25° C. for 22 hours. To the precipitate of dimethylol urea was added 2760 grams of ethanol (95%). The pH was adjusted to 2.8 with 20% sulfuric acid. After five minutes of agitation, the solution cleared and agitation was continued for an additional hour. The pH was then adjusted to 7.6 with 25% NaOH. A salt precipitate of sodium sulfate formed and was removed by filtration. The filtrate was evaporated at 35–50° C. for 2 hours at 24–28 mm. Hg to 15.3% water content. Another adjustment of pH, to 5.1, was then made with sulfuric acid. The mass was heated at reflux (91–93° C.) for one hour and twenty minutes, then neutralized with 25% NaOH to a pH of 7.3. The product, homopolymerized diethyl ether of dimethylol urea in admixture with minor amounts of monoethyl ether of dimethylol urea, herein designated Resin #7, had a viscosity of 420 cst. and an N.V.M. content of 58.4%.

C. *Copolymer of Dimethyl Ether of Dimethylol Urea and Phenol*

To 31 grams (⅓ mole) of phenol was added 148 grams (one mole) of crystalline dimethyl ether of dimethylol urea and 0.10 gram of p-toluene sulfonic acid as a catalyst for the reaction. The mixture was quickly brought to reflux, heated for 40 minutes at 91–98° C., and cooled. Ten milliliters of methanol was collected as distillate. The produced copolymer herein designated Resin #8 was a clear liquid resin having infinite dilutability with water as indicated by the absence of clouding or formation of a precipitate after 3500% dilution.

The following examples are presented to illustrate formation of the blended heat curable compositions of this invention, uses therefor and results obtained therewith.

*Example 1.—Punking Resistance*

Various resinous binders were used:

Binder (1) _____ Resole B.
Binder (2) _____ 1:1 blend of Resole B and Resin #1.
Binder (3) _____ Resole C.
Binder (4) _____ 1:2 blend of Resole C and Resin #4.
Binder (5) _____ 1:1 blend of Resole C and Resin #4.
Binder (6) _____ 2:1 blend of Resole C and Resin #4.
Binder (7) _____ 1:1 blend of Resole B and Resin #8.

The blends were prepared by mixing the component resins together and agitating for several minutes at room temperature.

Insulating batts were prepared as follows:

Glass wool mats were first cleaned by heating to a temperature of 800° F. for 8–16 hours to completely burn off the oil coating the glass fibers. The cleaned mat was cut into 6″ x 6″ x 3″ sections, each weighing 157 grams. These sections were placed in a wire cage and then in a vacuum desiccator. Aqueous solutions of the resin containing 5–16% N.V.M. were drawn into the desiccator by vacuum until the mat was completely immersed. The wire cage and batt were then removed from the desiccator and fitted on a mechanical stirrer. The cage was held stationary for two minutes to allow resin drainage, then rotated for another minute to remove the excess resin.

The drained mat was placed in a forced air curing oven for one hour and thirty minutes at 390° F. and subsequently cooled and weighed. Two of the cured mats, or batts, were placed one upon the other to give a 6″ cube. A thermocouple was placed in the center of the lower batt section and the assembly placed in an oven adjusted to the desired ambient temperature. Exotherms were continuously measured until a peak exotherm was indicated and passed. The batts were then removed from the oven and visually inspected to determine the existence of and, if any, the extent of punking that had occurred. Evidence of punking was the appearance of a white spot of ash of burned and decomposed binder. The absence of white ash meant no punking had occurred irrespective of an exotherm occurring during the reaction. After existence of punking was determined, the batts were cleaned of resin by heating at 800° C. for 14 hours, and after cooling were reweighed to ascertain exact initial resin content by weight differences in the impregnated and cleaned batts.

Table II below identifies each of the resin binders used, the ambient temperatures to which they were exposed in the punking test and the peak exotherm measured by the thermocouple.

TABLE II

| Ambient Temp., ° F. | Binder | Percent Resin cured batt | Peak Exotherm, ° F. | Punking |
|---|---|---|---|---|
| 450 | 1 | 5.3 | 466 | No. |
| 450 | 1 | 10.0 | 1,340 | Yes. |
| 450 | 1 | 10.5 | 1,378 | Yes. |
| 500 | 1 2 | 10.0 | 736 | No. |
| 500 | 7 | 13 | 725 | No. |
| 550 | 1 2 | 5.2 | 853 | No. |
| 450 | 3 | 8.6 | 1,380 | Yes. |
| 500 | 4 | 12.2 | 676 | No. |
| 500 | 5 | 16.3 | 833 | No. |
| 500 | 6 | 6.4 | 672 | No. |
| 550 | 5 | 5.8 | 700 | No. |

¹ This blend which is typical of all these blends remained clear over a five-week period, stored at 40° F. There was no sign of precipitate formation, such as occurs with most other urea-containing phenolic resins.

Binders 1 and 3, Resoles B and C respectively, which are water soluble phenolic resins of the prior art should be compared with the various blended binders of this invention shown in Table II. It will be noted that while Binder 1 did not punk when present to an extent of 5.3%, an increase to 10.5% binder content caused punking despite the ambient temperature being only 450° C. Significantly, higher ambient temperatures, e.g. 500° C., and higher did not cause punking in the blended compositions. Use of Binder 2 at 5.2% concentration and at an ambient temperature of 550° C. or Binder 2 content at 10.0% and 500° C. ambient temperatures did not cause punking in either instance. The superiority of the blends in terms of resistance to punking over high formaldehyde-to-phenol ratio resoles is clearly apparent.

Binder 3, a very high formaldehyde to phenol ratio resole (3.0:1) punked at as low as 450° C. and 8.6% concentration. Higher concentrations (12.2% and 16.3%) and/or higher temperatures (400° C. and 550° C.) were withstood by the blends of this invention with no punking. Various ratios of phenolic resin to alkyl ether of dimethylol urea resin (1:2, 1:1, 2:1) were successfully employed.

Absence of punking was determined by absence of white ash in the batt after the peak exotherm had passed. Exotherms per se do not indicate punking.

*Example 2.—Aging Resistance*

A 1:1 blend of Resole C and Resin #4 (Binder 5 above) was tested for aging charcteristics at 40° F. and 75° F. All samples were brought to a pH of 7.9 with 25% sodium hydroxide. Water was added to the resin in measured quantities, after the period of standing indicated in Table III below. The amount of water (water-dilutability) which could be added (expressed as parts water/parts binder composition) before clouding due to precipitation appeared is given in the table as the measure of aging resistance. For comparison, Resole C was similarly tested. A storage life of two months (60 days) at 40° C. and two weeks (14 days) at 75° C. is entirely adequate for commercial use.

TABLE III.—WATER-DILUTABILITY (PARTS WATER/PART RESIN)

| Days | Resole C at 40° F. | Binder #5 at 40° F. | Resole C at 75° F. | Binder #5 at 75° F. |
|---|---|---|---|---|
| 0 | 35+ | 35+ | 35+ | 35+ |
| 2 | 35+ | 35+ | 35+ | 35+ |
| 6 | 35+ | 35+ | 35+ | 35+ |
| 8 | 35+ | 35+ | 26 | 10 |
| 13 | 35+ | 35+ | 14 | 7 |
| 64 | 35+ | 35+ | | |

No clouding or precipitate appeared in any of the samples during the aging period investigated.

Example 3.—Application Efficiency

Tests were carried out to determine roughly the percentage of resin that would ordinarily actually be laid down as binder onto the insulation and not lost as volatile matter. The test was conducted in a spray chamber into which was fitted a piece of glass cloth stitched in the form of a cone. When the temperature of the chamber reached 170° C., 50% N.V.M. content resin or blend was sprayed into the center of the cone. The difference in weight of the cone before and after spraying, divided by the sprayed resin N.V.M. content was recorded as the application efficiency of the resin. Table IV below lists values of efficiency obtained on various blends. All the values are high enough to be useful commercially.

TABLE IV

| System (pH=7.0) | | Ratio | Application Efficiency, Percent |
|---|---|---|---|
| Resole | Resin No. | | |
| A | | 1:0 | 58.0 |
| A | 5 | 1:1 | [1] 58.5 |
| A | 6 | 1:1 | 59.7 |
| C | | 1:0 | 67.9 |
| C | 5 | 1:1 | 60.0 |
| C | 6 | 1:1 | [2] 61.2 |
| B | | 1:0 | 63.4 |
| B | 2 | 1:1 | 58.3 |
| B | 2 | 2:1 | 61.0 |
| B | 2 | 0:1 | 61.8 |

[1] 57.5 at pH=4.6.
[2] 61.7 at pH=4.6.

Importantly, no spray drying occurred with any of the above resin systems. Application efficiency at pH 4.6 is given to show the efficiency of the resin systems of this invention under acidic operating conditions which are sometimes encountered. For example, an acidic system is desirable to improve color and obviate possible degradation of the glass which can occur under alkaline conditions.

Example 4.—Water Resistance—Dry and Wet Strength

The dry and wet bonding strength of two blends typical of this invention were measured. The percent strength retained after wetting was calculated and is an index of water resistance.

Resin #1 and Resin #2 were each blended 1:1 with Resole B with sufficient water added to form binders containing 50% N.V.M. contents with each component of each blend contributing 25% N.V.M. contents. In each instance 80 grams of the blend to be tested were mixed with 800 grams of Wedron 60 testing sand in a Kitchen Aid mixer for 7 minutes. Tensile test specimens, dogbone-shaped, 3" long, ½" thick and 1" wide at the narrowest point were molded as follows:

Fifty-five grams of resin/sand mixture was charged to the metal two-piece split mold which rested on a flat back-up plate. The mixture was formed into a dogbone-shaped piece by pounding. The sample had sufficient green strength to be removed from the mold. The sample was heated in a 450° C. oven for fifteen minutes. Samples were also made using unblended Resole B and unblended Resin #2. After cooling, the cured specimens were tested in a Tinius-Olsen testing machine using a jaw separation speed of ¼" per minute. The results were as follows:

TABLE V

| | Resin No. 2 | Resole B | Blend Resole B/Resin No. 1 | Blend Resole B/Resin No. 2 |
|---|---|---|---|---|
| Dry strength, p.s.i. | [1] 902 | [2] 587 | [1] 744 | [1] 834 |
| Wet strength, p.s.i. | [1] 101 | [2] 349 | [1] 434 | [1] 464 |
| Percent strength retention | 11 | 59 | 58 | 56 |

[1] Average of 5 samples.
[2] Average of 10 samples.

Wet strength was obtained after soaking the bars in water for 24 hours at room temperature (23–27° C.). The results show that the blend is comparable in water resistance to the unmodified phenolic resin and greatly superior to the dimethyl ether of dimethylol urea homopolymer.

Example 5

Glass wool batts were prepared using Resole B blended 1:1 with Resin #8. Half of the batts were soaked for forty-eight hours at 75° F. and the other half were conditioned ninety-six hours at 95% relative humidity and 120° F. The batts showed no evidence of swelling, softening, or bond degradation at the end of these periods.

Example 6

The blend of Example 5 was used to bond glass beads. Additional samples were bonded with Resole B only.

Dry strength and wet strength (after exposure to 75° F. and 90% relative humidity environment for 24 hours) were measured. Dry strength (tensile) of the blend, measured as in Example 4, was 425 pounds/sq. in.; of the Resole B alone, only 315 pounds/sq. in.

Both samples had a wet strength (tensile) of 50 pounds/sq. in.

Example 7

Glass wool batts were prepared as in Example 4 using: Resole A; Resole A blended 1:1 with Resin #6; Resole C; and Resole C blended 1:1 with Resin #6. Each of the blends contained 0.1% silicone oil as a wetting agent to improve the resin-to-glass bond.

The batts were cured and cut into six 3" x 2" x 3" pieces. The dimensions of each of the pieces of each of the batts were recorded to the nearest 1/16". Three of the pieces from each batt were immersed in 75° F. water and soaked for 116 hours. The remaining three pieces of each batt were placed in a 120° F. and 95% relative humidity atmosphere for 96 hours. At the end of these periods, the dimensions were again measured. The dimensions were the same in each case. No swelling had occurred, indicating that the water resistance of the blends of this invention, surprisingly in view of their urea content, is at least equivalent to unmodified resole resins to which they are demonstratably superior in punking resistance.

The blends of this invention comprising phenolic resole resins with homopolymers and/or copolymers of ethers of dimethylol urea are primarily useful as nonpunking binder compositions for insulation batts, acoustical tile and the like. Other applications for these blends include use as a binder for coated abrasives, a starch insolubilizer, paper impregnant, wood waste binder and other uses for which water soluble phenolic resins generally are employed.

As with phenolic resin compositions, compositions comprising the blends of this invention can contain fillers, pigments, additives, extenders and the like.

What is claimed is:

1. A liquid water-dilutable heat-curable composition useful as a binder for mineral fiber-containing structures comprising a blend of an alkaline-catalyzed water-dilutable liquid phenolic resole and a water-dilutable liquid condensation reaction product selected from the group consisting of homopolymeric condensation reaction products of monoalkyl ethers of dimethylol urea wherein each alkyl group has from one to two carbon atoms inclusive, homopolymeric condensation reaction products of dialkyl ethers of dimethylol urea wherein each alkyl group has from one to two carbon atoms inclusive and copolymeric condensation reaction products of dialkyl ethers of dimethylol urea wherein each alkyl group has from one to two carbon atoms inclusive with a mononuclear phenol having three replaceable hydrogen atoms thereon.

2. A liquid water-dilutable heat-curable composition useful as a binder for mineral fiber-containing structures comprising a blend of an alkaline-catalyzed water-dilutable liquid phenolic resole and a water-dilutable liquid homopolymeric self-condensation reaction product of monoalkyl ethers of dimethylol urea wherein the alkyl group has from one to two carbon atoms inclusive.

3. A liquid water-dilutable heat-curable composition useful as a binder for mineral fiber-containing structures comprising a blend of an alkaline-catalyzed water-dilutable liquid phenolic resole and a water-dilutable liquid homopolymeric self-condensation reaction product of dialkyl ethers of dimethylol urea wherein the alkyl groups have from one to two carbon atoms inclusive.

4. A liquid water-dilutable heat-curable composition useful as a binder for mineral fiber-containing structures comprising a blend of an alkaline-catalyzed water-dilutable liquid phenolic resole and a water-dilutable liquid copolymeric condensation reaction product of dialkyl ethers of dimethylol urea wherein each alkyl group has from one to two carbon atoms inclusive and a mononuclear phenol having three replaceable hydrogen atoms thereon.

5. The composition of claim 3 wherein the dialkyl ether of dimethylol urea is the diethyl ether of dimethylol urea.

6. The composition of claim 3 wherein the dialkyl ether of dimethylol urea is the dimethyl ether of dimethylol urea.

7. The composition of claim 4 wherein the dialkyl ether of dimethylol urea is the diethyl ether of dimethylol urea.

8. The composition of claim 4 wherein the dialkyl ether of dimethylol urea is the dimethyl ether of dimethylol urea.

9. The composition of claim 5 wherein the viscosity of the water-dilutable liquid homopolymeric self-condensation reaction product ranges from 50 to 10,000 centistokes when containing from 14–16% water.

10. The composition of claim 6 wherein the viscosity of the water-dilutable liquid homopolymeric self-condensation reaction product ranges from 50 to 10,000 centistokes when containing from 14–16% water.

11. The composition of claim 7 wherein the copolymeric condensation reaction product has a viscosity ranging from 50 to 10,000 centistokes at 56–64% non-volatile matter content.

12. The composition of claim 8 wherein the copolymeric condensation reaction product has a viscosity ranging from 50 to 10,000 centistokes at 56–64% non-volatile matter content.

13. A liquid water-dilutable heat-curable composition useful as a binder for mineral fiber-containing structures comprising per 100 parts by weight at least 25 parts by weight of an alkaline-catalyzed water-dilutable liquid phenolic resole blended with a water-dilutable liquid heat reaction product selected from the group consisting of homopolymeric condensation reaction products of monoalkyl ethers of dimethylol urea wherein each alkyl group has from one to two carbon atoms inclusive, homopolymeric condensation reaction products of dialkyl ethers of dimethylol urea wherein each alkyl group has from one to two carbon atoms inclusive and copolymeric condensation reaction products of dialkyl ethers of dimethylol urea wherein each alkyl group has from one to two carbon atoms inclusive with a mononuclear phenol having three replaceable hydrogen atoms thereon, said composition being dilutable with at least four parts by volume of water per part by volume of said composition without permanent clouding.

14. A liquid water-dilutable heat-curable composition useful as a nonpunking binder for mineral fiber-containing structures comprising per 100 parts by weight from 25 to 75 parts by weight of an alkaline-catalyzed water-dilutable liquid phenolic resole blended with a water-dilutable liquid heat reaction product selected from the group consisting of homopolymeric condensation reaction products of monoalkyl ethers of dimethylol urea wherein each alkyl group has from one to two carbon atoms inclusive, homopolymeric condensation reaction products of dialkyl ethers of dimethylol urea wherein each alkyl group has from one to two carbon atoms inclusive and copolymeric condensation reaction products of dialkyl ethers of dimethylol urea wherein each alkyl group has from one to two carbon atoms inclusive with a mononuclear phenol having at least three replaceable hydrogen atoms thereon, said composition being dilutable with from 9 to 20 parts by volume of water per part by volume of said composition without permanent clouding.

15. The composition of claim 4 wherein the copolymeric condensation reaction product is the product of the reaction of three moles of dialkyl ether of dimethylol urea wherein each alkyl group has from one to two carbon atoms inclusive per mole of the mononuclear phenol.

16. A water resistant nonpunking bonding composition for mineral fibers produced by curing to an infusible state a composition comprising a blend of an alkaline-catalyzed water-dilutable liquid phenolic resole and a water-dilutable liquid heat reaction product selected from the group consisting of homopolymeric condensation reaction products of monoalkyl ethers of dimethylol urea wherein each alkyl group has from one to two carbon atoms inclusive, homopolymeric condensation reaction products of dialkyl ethers of dimethylol urea wherein each alkyl group has from one to two carbon atoms inclusive and copolymeric condensation reaction products of dialkyl ethers of dimethylol urea wherein each alkyl group has from one to two carbon atoms inclusive with a mononuclear phenol having at least three replaceable hydrogen atoms thereon, said water-dilutable liquid heat reaction product being present in an amount of at least 25 parts by weight per 100 parts by weight of said composition.

17. An insulation batt comprising mineral fibers bonded together by the composition claimed in claim 16.

References Cited in the file of this patent

UNITED STATES PATENTS

| | | |
|---|---|---|
| 2,201,914 | Oeffinger et al. | May 21, 1940 |
| 2,604,427 | Armstrong et al. | July 22, 1952 |
| 2,693,460 | Gagliardi | Nov. 2, 1954 |
| 2,915,503 | Vogel | Dec. 1, 1959 |

FOREIGN PATENTS

| | | |
|---|---|---|
| 527,414 | Great Britain | Oct. 8, 1940 |
| 530,432 | Canada | Sept. 18, 1956 |